Aug. 20, 1940.  R. MOON  2,212,032
DUSTING MACHINE
Filed May 8, 1939  2 Sheets-Sheet 2
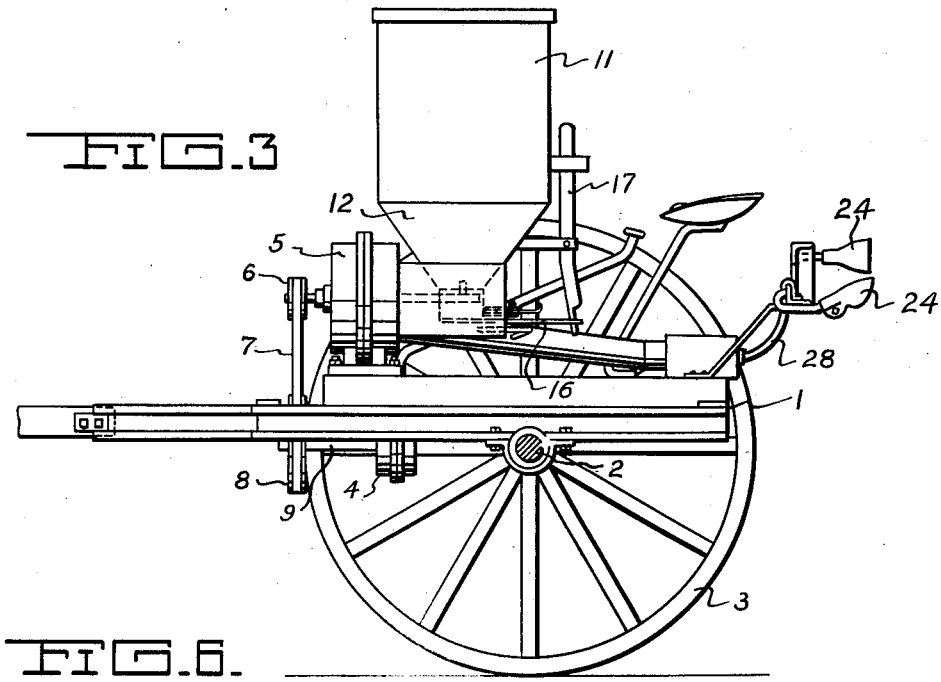
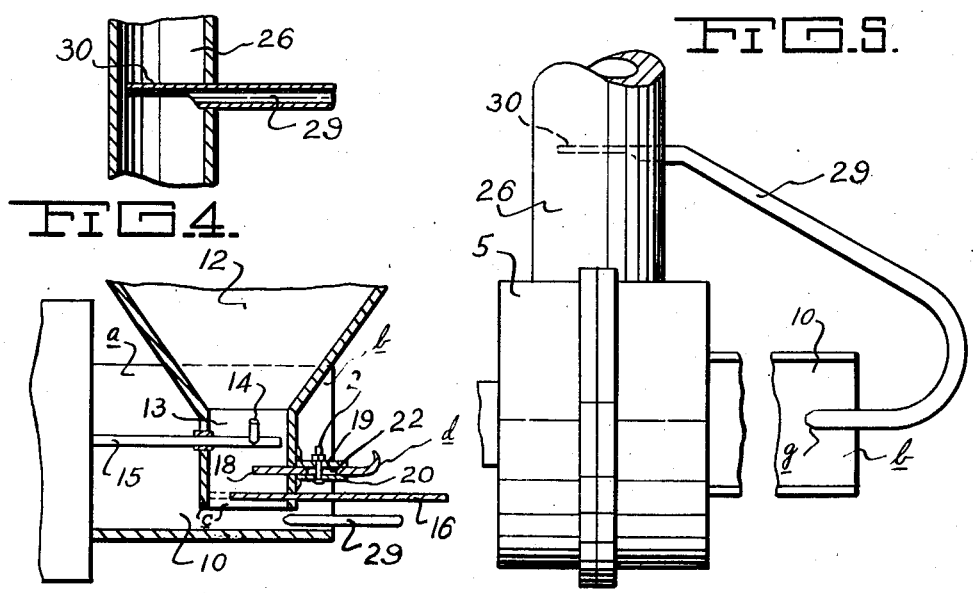
Richard Moon
INVENTOR.
BY Ernest G. Hood
ATTORNEY.

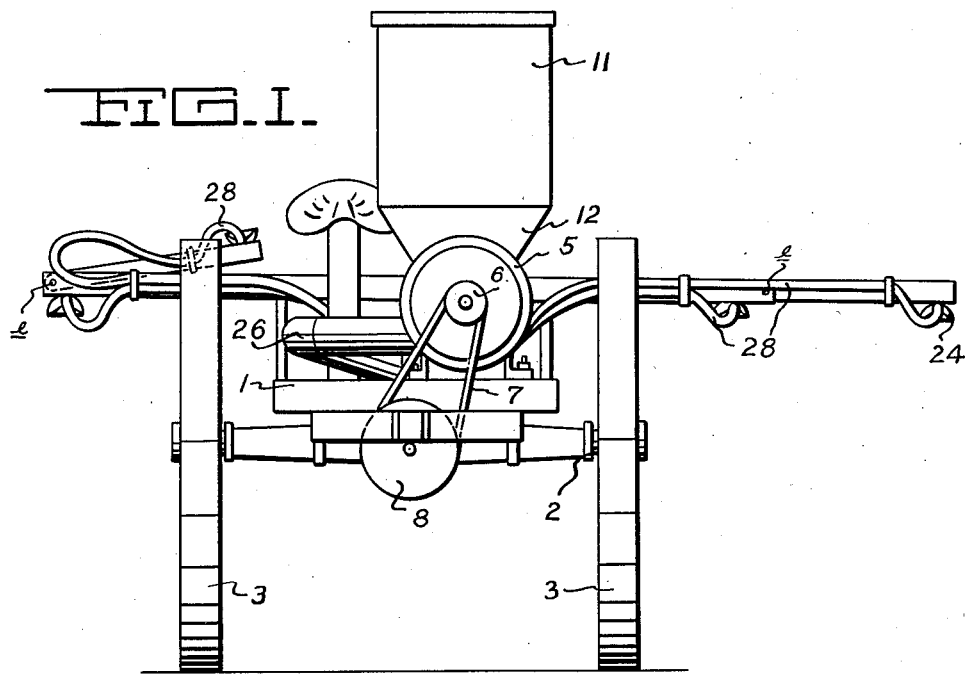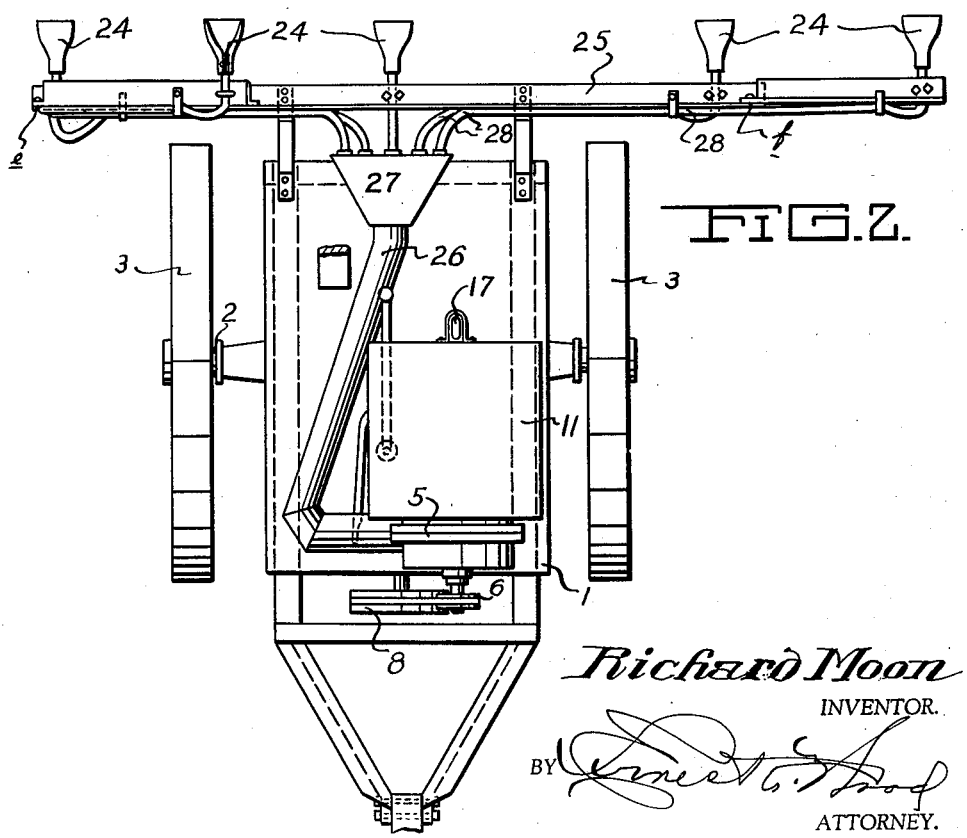

Patented Aug. 20, 1940

2,212,032

UNITED STATES PATENT OFFICE 2,212,032

DUSTING MACHINE

Richard Moon, Eddy, Tex.

Application May 8, 1939, Serial No. 272,299

1 Claim. (Cl. 43—148)

This invention relates to apparatus for distributing insecticide on vegetation and has particular reference to a dusting device for dispensing powdered poison such as calcium arsenate, nicotine dust, Paris green, or any other dry poison used in insect control.

The primary object of the invention resides in the provision of an apparatus wherein the poison within the receiving chamber, which is arranged in juxtaposition with relation to the blower of the device, is sprayed with air, thus providing a more even mixture for distribution.

Another object of the invention resides in the provision of a device of this character wherein the receiving chamber is kept free of accumulations of poison.

Yet another object of the invention resides in the provision of means whereby the draft created by the blower is employed to accomplish the foregoing objects.

Broadly, the invention seeks to comprehend the provision of a device for distributing powdered poison wherein the draft of the apparatus is employed in providing an even mixture as well as preventing the accumulation of poison in the receiving chamber.

Other and lesser objects will become manifest as the description proceeds, taken in connection with the accompanying drawings wherein:

Figure 1 is a front elevational view of the device.

Figure 2 is a plan view of Figure 1.

Figure 3 is a side elevational with one of the wheels removed.

Figure 4 is a fragmentary sectional view of the receiving chamber illustrating the spout of the hopper positioned therein.

Figure 5 is an enlarged fragmentary plan view of a portion of the device illustrating the blower, its adjoining conduit and receiving chamber as well as the return pipe employed in the device, and Figure 6 is a fragmentary sectional view illustrating an end of the return pipe positioned in the conduit.

Accordingly, the invention is comprised of a vehicle having a frame 1 supported by an axle 2 and wheels 3. Positioned beneath the frame 1 there is provided a gear box 4 which is driven by a power take-off (not shown) which may be of any conventional type though preferably connected to the axle.

Upon the frame 1 there is a blower 5 which is operated by a pulley 6 rotatably attached thereto. A belt 7 connects another pulley 8, the latter being driven by the gear box 4 through the medium of a stub shaft 9 as particularly illustrated in Figure 3.

Positioned adjacent to the blower 5 there is a receiving chamber 10 which is preferably constructed of sheet metal and U-shaped in cross section, thus providing openings $a$ and $b$ in its upper and end sides.

Immediately above the chamber 10 there is a hopper 11 for retaining powdered poison preparatory to distribution. The lower end 12 of the hopper 11 is substantially funnel shaped and has a spout 13 formed at the lower end thereof, the said spout being substantially within the chamber 10. An agitator in the form of a short projection 14 mounted on a rotatable shaft 15, the latter being driven by the blower 5, a detail of which is illustrated in Figure 4.

In the lowermost end of the spout 13, a valve 16 is constructed of a flat material and is slidably engaged in the lower opening $c$. The outer end of the valve 16 is operatively connected to a pivoted lever 17, the latter being mounted on the side of the hopper 11 as illustrated in Figures 2 and 3. This arrangement affords a means whereby the operator may start and stop the flow of powder at will.

A slide valve 18 for adjusting the quantity of powder to be used is likewise slidably engaged in the spout 13 and is provided with guide plates 19, 20 on the upper and lower sides thereof. A bolt 21 arranged through the guide plates 19, 20, and a slot 22 in the valve 18 limits the movement of the said valve when manually operated by the handle at the outer end $d$.

Rearwardly of the device there is a series of adjustable dusting nozzles 24, a detailed description of which is not necessary since the nozzles are well known to the art. These are arranged upon an angle iron support 25, the outer ends of which are pivoted at $e$ and $f$ for upward movement, thus allowing the apparatus to pass through gates, doors and the like, but are extended when in operative position.

Extending from the blower 5 there is a conduit 26, the end of which terminates in a manifold 27. A series of flexible connections 28 communicate the manifold 27 with the various nozzles 24.

A return pipe 29 is positioned within the conduit 26 and extends through the open end $b$ of the chamber 10 and terminates in a constricted opening $g$, the latter acting as a nozzle. The other end of the return pipe 29 positioned within the conduit 26 laterally projects therethrough and the side nearest the blower 5 is cut away in order that the opposing side may be formed into a baffle 30. The purpose of the return pipe 29 is to divert a portion of the blast of air forced through the conduit 26 by the blower into the chamber 10 behind the opening C, (Figure 4) to prevent accumulations of powder at this point and to facilitate discharge thereof.

Thus, in operation, the blower 5 is set in motion as the apparatus is moved by reason of the elements previously described, thereby creating a draft, the intake of which draws air commingled with powdered poison from the receiving chamber 10 whence it is conducted through the conduit 26 to the manifold 27 and thence to the various nozzles 24 where it is ejected.

As the flow of the dry poison from the hopper 11 passes through the valves 16 and 18 it is deposited within the receiving chamber 10 where it might accumulate. The arrangement of the return pipe 29, previously described, provides for the return of a certain amount of draft which, when ejected from the nozzle *g*, causes the accumulated powder to commingle with air, the action of the blower 5 being such that it will then be drawn thereinto. Moreover, the powder ejected from the spout 13 is likewise caused to be commingled with air, thus providing a more even mixture within the conduit 26.

Manifestly, the structure herein shown and described is capable of considerable changes and modifications from time to time by those skilled in the art and such changes and modifications as may be resorted to falling within the spirit and intent of the invention may also be considered as falling within the scope of the appended claim.

What is claimed is:

In a dusting apparatus for distributing powdered insecticide on vegetation, the combination of a frame, a pair of wheels and an axle supporting said frame, a blower mounted on said frame, a substantially U-shaped chamber communicating with said blower, means cooperating with the blower and said chamber for introducing the insecticide into the same, said means comprising a hopper arranged above the said chamber, a spout forming the lower portion of the said hopper and positioned within the said chamber, a slide valve and a closure valve arranged in said spout, means for operating the said valves, an agitator likewise disposed in said spout and driven by the shaft of said blower, a transverse support mounted on said frame, dusting nozzles fixed to said support, a manifold mounted on said frame, a conduit connecting the said manifold with the discharge of said blower, connections between said nozzles and said manifold, and a return pipe extending from within said conduit to the inner portion of said chamber for diverting air from said conduit to said chamber.

RICHARD MOON.